(No Model.)
J. J. BLACK.
VEHICLE RUNNING GEAR.
No. 451,021. Patented Apr. 28, 1891.
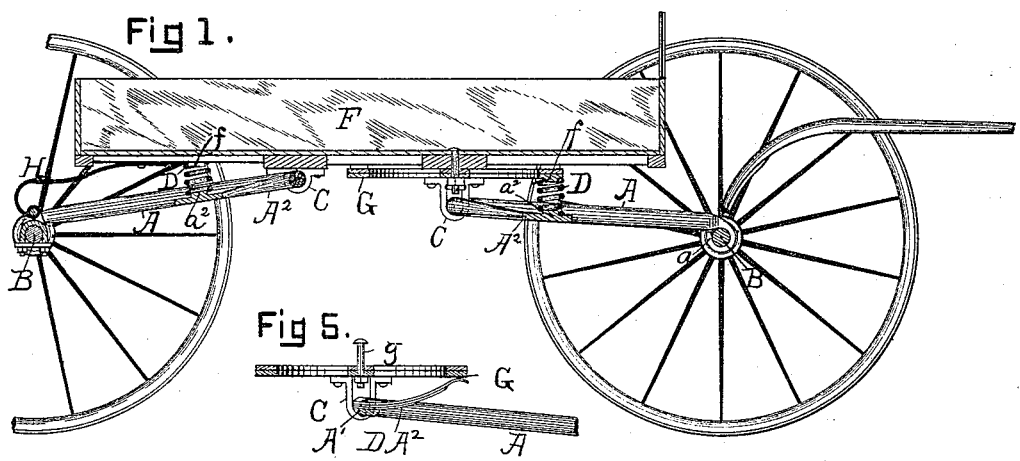
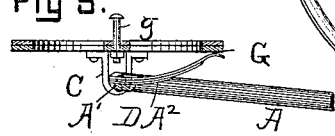
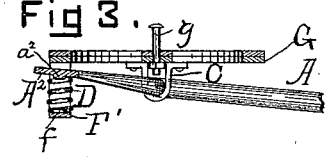
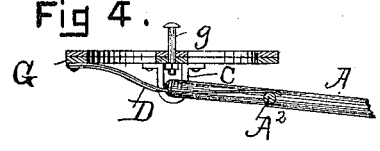
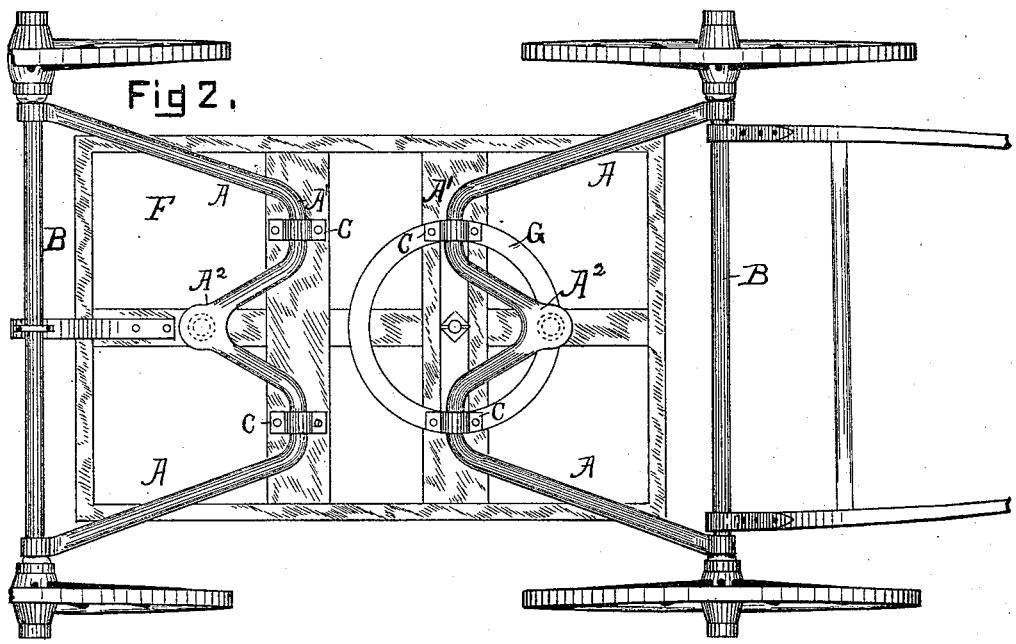
WITNESSES.
Frank Miller.
Albert H. Bates.
INVENTOR.
John J. Black
By his attorneys
Watson & Thurston

UNITED STATES PATENT OFFICE.

JOHN J. BLACK, OF CLEVELAND, OHIO, ASSIGNOR TO THE BLACK SPRING AND GEAR COMPANY, OF SAME PLACE.

VEHICLE RUNNING-GEAR.

SPECIFICATION forming part of Letters Patent No. 451,021, dated April 28, 1891.

Application filed July 3, 1890. Serial No. 357,610. (No model.)

*To all whom it may concern:*

Be it known that I, JOHN J. BLACK, a citizen of the United States, residing at Cleveland, in the county of Cuyahoga and State of Ohio, have invented certain new and useful Improvements in Front Spring-Platforms for Road-Wagons, of which the following is a full, clear, and exact description, reference being had to the accompanying drawings, in which—

Figure 1 is a sectional side elevation of a wagon embodying my invention. Fig. 2 is a bottom view of said wagon; and Figs. 3, 4, and 5 are sectional side views of modified forms of the front spring-platform.

My invention relates to the spring-platforms for connecting a wagon-body to the forward axle.

The objects of my invention are to combine a novel and inexpensive spring-platform with the fifth-wheel and front axle, whereby the wagon-body is easily supported and the wagon itself adapted to make a short turn.

To this end it consists in the construction and combination of parts herein described, and pointed out definitely in the claims.

Referring to the parts by letters, A A represent side bars, the outer ends of which are adapted to be connected with the axle B, and these bars are adapted to move more or less about a center in or near the axis of the axle. If the bars A A are rigidly secured to the axle, the above-described mode of operation will result from the turning of the axle in its bearings in the wheels. The best construction, however, is that in which cylindrical parts of the axle pass loosely through eyes on the ends of said bars. When the outer ends of the bars A A are connected with the front axle by means of eyes in their ends, through which cylindrical parts of the axle pass, the revolution of the front axle is satisfactorily prevented by rigidly connecting the shafts therewith. The rear ends of said bars are rigidly connected to a cross-bar A', which serves, as hereinafter explained, as a rock-shaft. Rigidly secured to this rock-shaft and in the form shown in Figs. 1 and 2, integral with it, is an arm $A^2$, extending from said rock-shaft in the same general direction as the side bars. The rock-shaft A' is pivoted to the fifth-wheel G by means of the ears C, and the coiled spring D is interposed between the upper end of the arm $A^2$ and the fifth-wheel. The fifth-wheel is attached to the wagon-body by a king-bolt or other equivalent device.

In the above-described construction of front spring-platform all the parts bear a fixed relation to the fifth-wheel and move with it, and a short turn may be made with the wagon without affecting the operation of said parts.

In Figs. 3, 4, and 5 are shown certain modifications of the front spring-platforms. The side bars are rigidly secured to a rock-shaft, which is pivoted to the fifth-wheel, as in the construction first described, and the spring D engages with the fifth-wheel, as in said construction.

In Fig. 3 the arm $A^2$, which is rigidly secured to the rock-shaft, extends from it in the opposite direction to that in which the side bars extend. A bracket F is secured to the fifth-wheel, and a coiled spring D is introduced between the upper side of the bracket and the under side of the arm $A^2$.

In the form shown in Fig. 4 the spring D is a leaf-spring, which is rigidly attached to the fifth-wheel at one end, while the other end bears upon the arm $A^2$, and thus resists the approach of said arm toward the wagon-body.

In the form shown in Fig. 5 the arm $A^2$ is in the form of a leaf-spring, which is rigidly attached to the rock-shaft, while the free end engages with the fifth-wheel. This spring, which is marked $DA^2$, thus serves as both arm and spring, and thus resists the downward movement of the wagon-body.

Having thus described my invention, what I claim as new, and desire to secure by Letters Patent, is—

1. The combination, in a front spring-platform for road-wagons, of the fifth-wheel secured to the wagon-body by a king-bolt or other equivalent device, two side bars suitably connected at their forward ends to the front axle and rigidly connected at their rear ends to a rock-shaft which is pivoted to said fifth-wheel, and a spring adapted to resist the downward movement of the wagon-body, substantially as and for the purpose specified.

2. The combination, in a front spring-platform for road-wagons, of the fifth-wheel secured to the wagon-body by a king-bolt or other equivalent device, two side bars suitably connected at their front ends to the axle, a rock-shaft rigidly connecting the rear ends to said side bars and pivoted to the fifth-wheel, an arm rigidly attached to said rock-shaft, and a spring engaging with said arm and fifth-wheel, whether said spring be an integral part of the arm or a distinct piece, substantially as and for the purpose specified.

3. The combination, in a front spring-platform for road-wagons, of the fifth-wheel secured to the wagon-body by a king-bolt or other equivalent device, two side bars connected at their forward ends to the forward axle, a rock-shaft rigidly connecting their rear ends, said rock-shaft being pivoted to the fifth-wheel, an arm rigidly secured to said rock-shaft, and a coiled spring interposed between said arm and fifth-wheel, substantially as and for the purpose specified.

JOHN J. BLACK.

Witnesses:
E. L. THURSTON,
ALBERT H. BATES.